United States Patent
Lo et al.

(10) Patent No.: US 10,558,270 B2
(45) Date of Patent: Feb. 11, 2020

(54) METHOD FOR DETERMINING NON-CONTACT GESTURE AND DEVICE FOR THE SAME

(71) Applicant: EMINENT ELECTRONIC TECHNOLOGY CORP. LTD., Hsinchu (TW)

(72) Inventors: Chan-Peng Lo, Taichung (TW); Kao-Pin Wu, New Taipei (TW); Tom Chang, Taipei (TW)

(73) Assignee: EMINENT ELECTRONIC TECHNOLOGY CORP. LTD., Hsinchu (TW)

( * ) Notice: Subject to any disclaimer, the term of this patent is extended or adjusted under 35 U.S.C. 154(b) by 720 days.

(21) Appl. No.: 15/262,315

(22) Filed: Sep. 12, 2016

(65) Prior Publication Data

US 2017/0097683 A1    Apr. 6, 2017

Related U.S. Application Data

(60) Provisional application No. 62/236,963, filed on Oct. 4, 2015.

(30) Foreign Application Priority Data

May 26, 2016    (TW) .............................. 105116464 A

(51) Int. Cl.
G06F 3/0346    (2013.01)
G06F 3/01    (2006.01)
G06K 9/00    (2006.01)

(52) U.S. Cl.
CPC ............ *G06F 3/017* (2013.01); *G06F 3/0346* (2013.01); *G06K 9/00335* (2013.01)

(58) Field of Classification Search
CPC .... G06F 3/017; G06F 3/0346; G06K 9/00335
See application file for complete search history.

(56) References Cited

U.S. PATENT DOCUMENTS 8,229,226 B2 *    7/2012    Chuang .................. G06F 3/017
                                                            382/188
2010/0295783 A1 *    11/2010    El Dokor ................ G06F 3/017
                                                            345/158

(Continued)

FOREIGN PATENT DOCUMENTS

CN        10911048 A        12/2010
CN        102117117 A        7/2011

(Continued)

OTHER PUBLICATIONS

Search Report of Patent Application No. 105116454 (2 pages).
State Intellectual Properrty Office of the P.R.C. Search Report of Application No. 2016104644026 (4 pages).

*Primary Examiner* — Chanh D Nguyen
*Assistant Examiner* — Karin Kiyabu
(74) *Attorney, Agent, or Firm* — Patenttm.US; James Walters

(57) ABSTRACT

A method for determining non-contact gesture is applied to a device for the same. The device has an image sensor to detect an image sensing data, an inertial measurement sensor to detect an inertial sensing data, and a processor to determine if an object data is detected and to determine if an inertial event is occurred. The image sensing data in the same and/or adjacent image frame with the inertial events are excluded so that the image sensing data used to determine the gesture are those not influenced by the inertial events. Therefore, the accuracy of determining the gesture is enhanced.

12 Claims, 8 Drawing Sheets

(56) References Cited

U.S. PATENT DOCUMENTS

| | | |
|---|---|---|
| 2011/0227820 A1 | 9/2011 | Haddick et al. |
| 2012/0092328 A1 | 4/2012 | Flaks et al. |
| 2013/0057679 A1 | 3/2013 | Tiao et al. |
| 2014/0210689 A1* | 7/2014 | Sheu .................. G02B 27/017 345/1.3 |
| 2014/0340498 A1* | 11/2014 | Plagemann ............ G01B 11/14 348/77 |
| 2015/0066494 A1* | 3/2015 | Salvador ............. G10L 21/0202 704/224 |
| 2015/0346834 A1* | 12/2015 | Martinez Fernandez .................... G06F 3/017 340/12.5 |
| 2017/0185159 A1* | 6/2017 | Murase .................. G06F 1/163 |

FOREIGN PATENT DOCUMENTS

| | | |
|---|---|---|
| CN | 103365410 A | 10/2013 |
| CN | 102419631 B | 2/2015 |
| TW | I437464 B | 5/2014 |
| TW | I464640 B | 12/2014 |

* cited by examiner

METHOD FOR DETERMINING NON-CONTACT GESTURE AND DEVICE FOR THE SAME

CROSS-REFERENCE TO RELATED APPLICATIONS

This application claims the benefit of United States provisional application filed on Oct. 4, 2015 and having application Ser. No. 62/236,963, the entire contents of which are hereby incorporated herein by reference This application is based upon and claims priority under 35 U.S.C. 119 from Taiwan Patent Application No. 105116464 filed on May 26, 2016, which is hereby specifically incorporated herein by this reference thereto.

BACKGROUND OF THE INVENTION

1. Field of the Invention

The present invention relates to a method for determining non-contact gesture and a device for the same, especially to a optical image sensing method for determining non-contact gesture and a device for the same.

2. Description of the Prior Arts

With the progress of the technology, electronic products change with each passing day. The ways to input data or command into the electronic products also advance. From the traditional physical keyboard as an input way, it develops to input with a virtual keyboard in touch panel. Recently, a non-contact input way for the electronic device is also developed. The user does not need to touch the electronic device. The electronic device detects and identifies the user's gesture performing in the air through a non-contact sensor to execute a corresponding command. Especially to an apparatus that has an augmented reality (AR) function, using non-contact input is more intuitive and more convenient. The electronic device with the AR function, especially for wearable electronic devices, develops various applications such as games, distance meeting, navigation system and so on.

The non-contact way to input uses image sensors to capture the moving distance, speed, angle and so on of the user's palms or fingers waving in the air to determine as corresponding gestures. Then corresponding commands are executed. However, whether the electronic device is worn on or is held by the user, the electronic device is moved along with the user's unintentionally movement to result in the relative movement between the electronic device and the user's palms and fingers. Then the image sensor incorrectly determines the movement of the electronic device as the movement of the palms and fingers so that the incorrect gestures are identified to execute undesired commands. Therefore, the aforementioned situation becomes annoying disadvantages for the user to use the non-contact input way for the electronic device.

SUMMARY OF THE INVENTION

To overcome the shortcomings, the present invention provides a method for determining non-contact gesture and a device for the same to mitigate or obviate the aforementioned problems.

To achieve the aforementioned objective, the present invention provides a method for determining non-contact gesture comprising steps of:

a. detecting an image sensing data in a detecting range of a non-contact sensing device, and detecting an inertial sensing signal of the non-contact sensing device itself;

b. determining whether an inertial event is occurred based on the inertial sensing signal, determining whether an object data is detected based on the image sensing data; and c. when determining no inertial event is occurred and an object data is detected, determining and outputting a corresponding gesture based on at least one of the image sensing data.

Further, to apply the aforementioned method for determining non-contact gesture, the present invention provides a non-contact sensing device comprising:

a processor;

an inertial measurement sensor (IMU) electrically connected to the processor;

at least one image sensor electrically connected to the processor;

wherein the processor executes following steps:

a. receiving an image sensing data detected by the at least one image sensor, and receiving an inertial sensing signal of the non-contact sensing device itself detected by the IMU;

b. determining whether an inertial event is occurred based on the inertial sensing signal, determining whether an object data is detected based on the image sensing data; and c. when determining no inertial event is occurred and an object data is detected, determining and outputting a corresponding gesture based on at least one of the image sensing data.

The advantage of the present invention is to use the IMU to detect whether an inertial event is occurred. Therefore, the output gesture is not influenced by the inertial event to keep the gesture from being incorrectly determined or to keep the command from incorrectly triggering.

In another aspect, the present invention provides a method for determining a non-contact gesture applied to a portable electronic device comprising a gesture detecting unit to detect a user's gesture operation and a first sensor to detect a movement of the portable electronic device, and the method comprising steps of:

a. determining the movement of the portable electronic device is occurred according to an output of the first sensor; and b. interrupting a triggering caused by the user's gesture operation.

Other objectives, advantages and novel features of the invention will become more apparent from the following detailed description when taken in conjunction with the accompanying drawings.

DETAILED DESCRIPTION OF THE EMBODIMENTS

Figure 1:
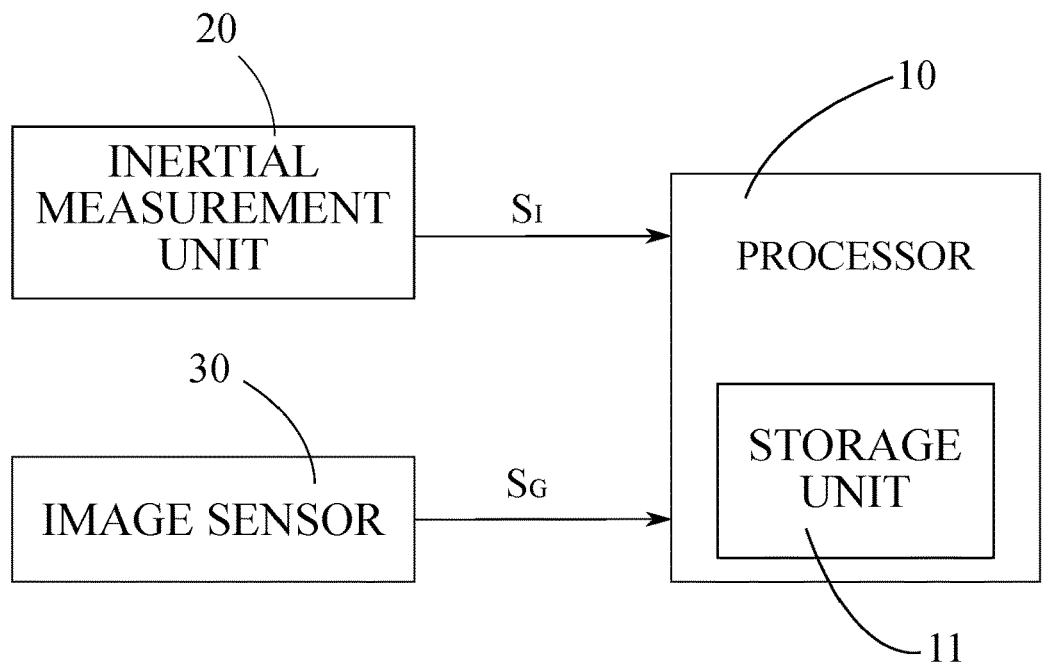
FIG. 1 is a block diagram of a first embodiment of a non-contact sensing device in accordance with the present invention.

With reference to FIG. 1, a non-contact sensing device in accordance with the present invention comprises a processor, an inertial measurement unit (IMU) 20 and at least one image sensor 30.

Figure 2:
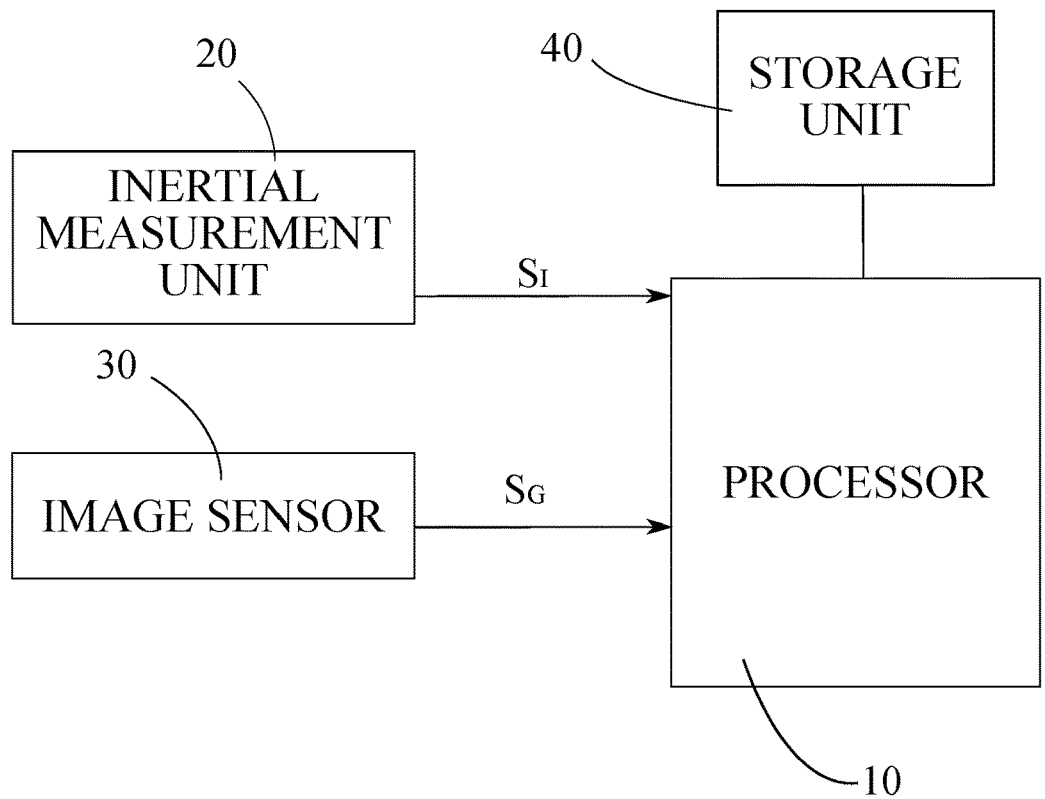
FIG. 2 is a block diagram of a second embodiment of a non-contact sensing device in accordance with the present invention.

In one embodiment as shown in FIG. 1, a storage unit 11 is built in the processor 10. In another embodiment as shown in FIG. 2, an external storage unit 40 is electrically connected to the processor 10.

The IMU 20 is electrically connected to the processor 10 and transmits an inertial sensing signal $S_I$ detected by the IMU 20 to the processor 10. The IMU 20 may be any sensing device that detects the movements of the objects. In one embodiment, the IMU 20 is a G-sensor. In one embodiment, the IMU 20 is an accelerometer. In one embodiment, the IMU is a gyroscope. In one embodiment, the IMU is a magnetometer.

The at least one image sensor 30 is electrically connected to the processor 10 and transmits a non-contact image sensing data $S_G$ to the processor 10. In one embodiment, the non-contact sensing device in accordance with the present invention comprises multiple image sensors 30 to capture the non-contact image sensing data $S_G$ from different angles and positions. Therefore, the precision of the image is enhanced or the images may be used for other image processing applications. In one embodiment, the image sensors 30 are optical image sensors.

Figure 3:
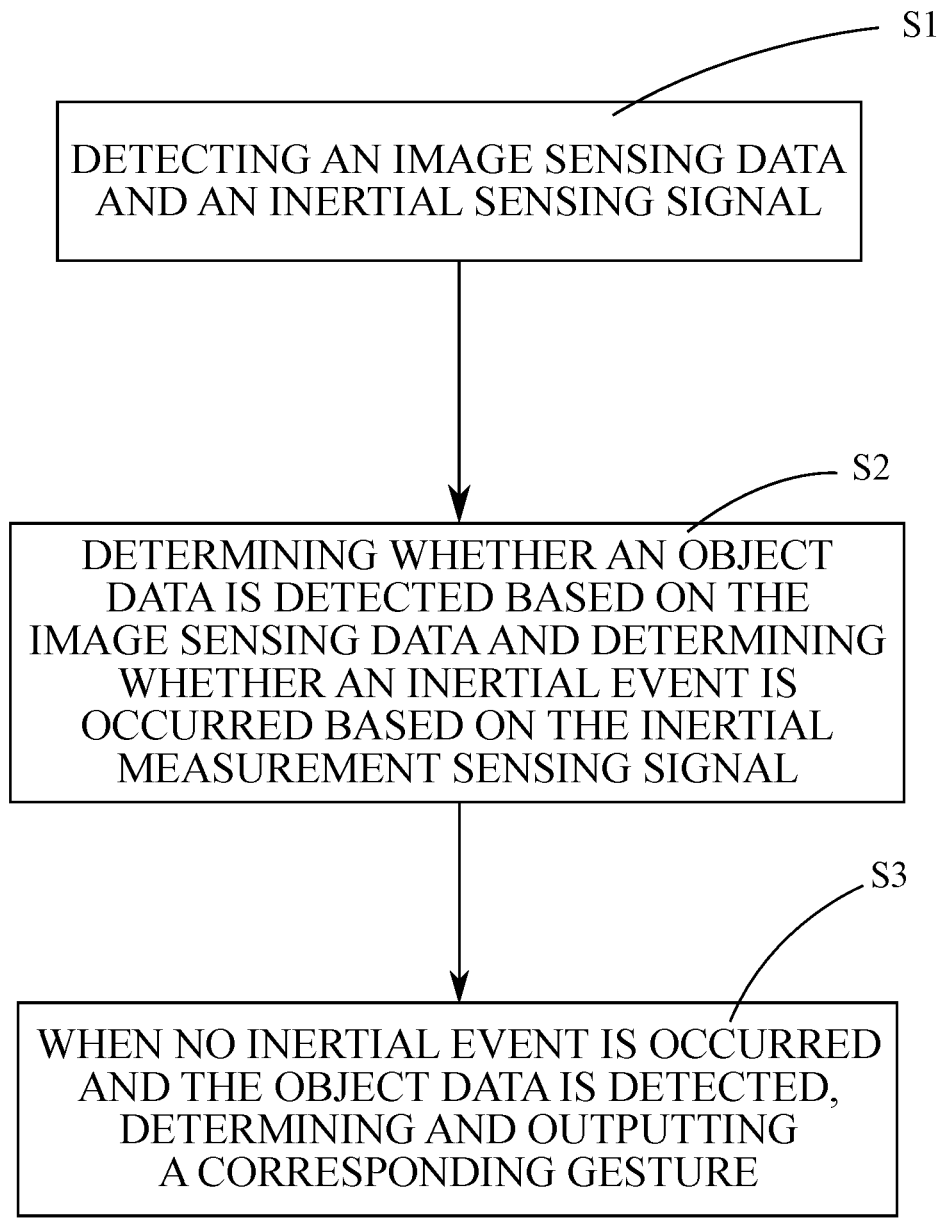
FIG. 3 is a flow chart of a first embodiment of a method for determining non-contact gesture in accordance with the present invention.

With reference to FIG. 3, a method for determining non-contact gesture in accordance with the present invention comprises following acts: Detecting an image sensing data $S_G$ and an inertial sensing signal $S_I$ (S1): The IMU 20 detects an inertial sensing signal $S_I$ of the non-contact sensing device worn on the user. The image sensor 30 detects an image sensing data $S_G$ in the sensing area of the image sensor 30. In one embodiment, the step S1 detects the image sensing data $S_G$ and the inertial sensing signal $S_I$ during an image frame.

Determining whether an object data is detected based on the image sensing data $S_G$ and determining whether an inertial event is occurred based on the inertial sensing signal $S_I$ (S2): The processor 10 determines whether an inertial event is occurred based on the inertial sensing signal $S_I$ and determines whether an object data is detected based on the image sensing data $S_G$. When no inertial event is occurred and the object data is detected, then step S3 is entered. When any one of the conditions is not met, the step S1 is entered. In one embodiment, whether an object data is detected and whether no inertial event is occurred are determined in the same image frame. To determine whether an inertial event is occurred may be accomplished by many kinds of methods. In one embodiment, the inertial sensing signal $S_I$ is compared with a threshold. When the inertial sensing signal $S_I$ exceeds the threshold, the inertial event is determined that is occurred. To determine whether an object data is detected may also be accomplished by many kinds of methods. In one embodiment, the image sensing data $S_G$ is compared with specific features of predetermined objects such as fingers, palms and so on to determine whether the image sensing data $S_G$ meets the features of one of the predetermined objects. If the image sensing data $S_G$ meets the features of one of the predetermined objects, the object data is determined that is detected.

Determining and outputting a corresponding gesture when no inertial event is occurred and the object data is detected (S3): When the processor 10 determines that no inertial event is occurred and the object data is detected, the processor 10 determines and outputs a corresponding gesture based on the at least one image sensing data $S_G$.

Figure 4:
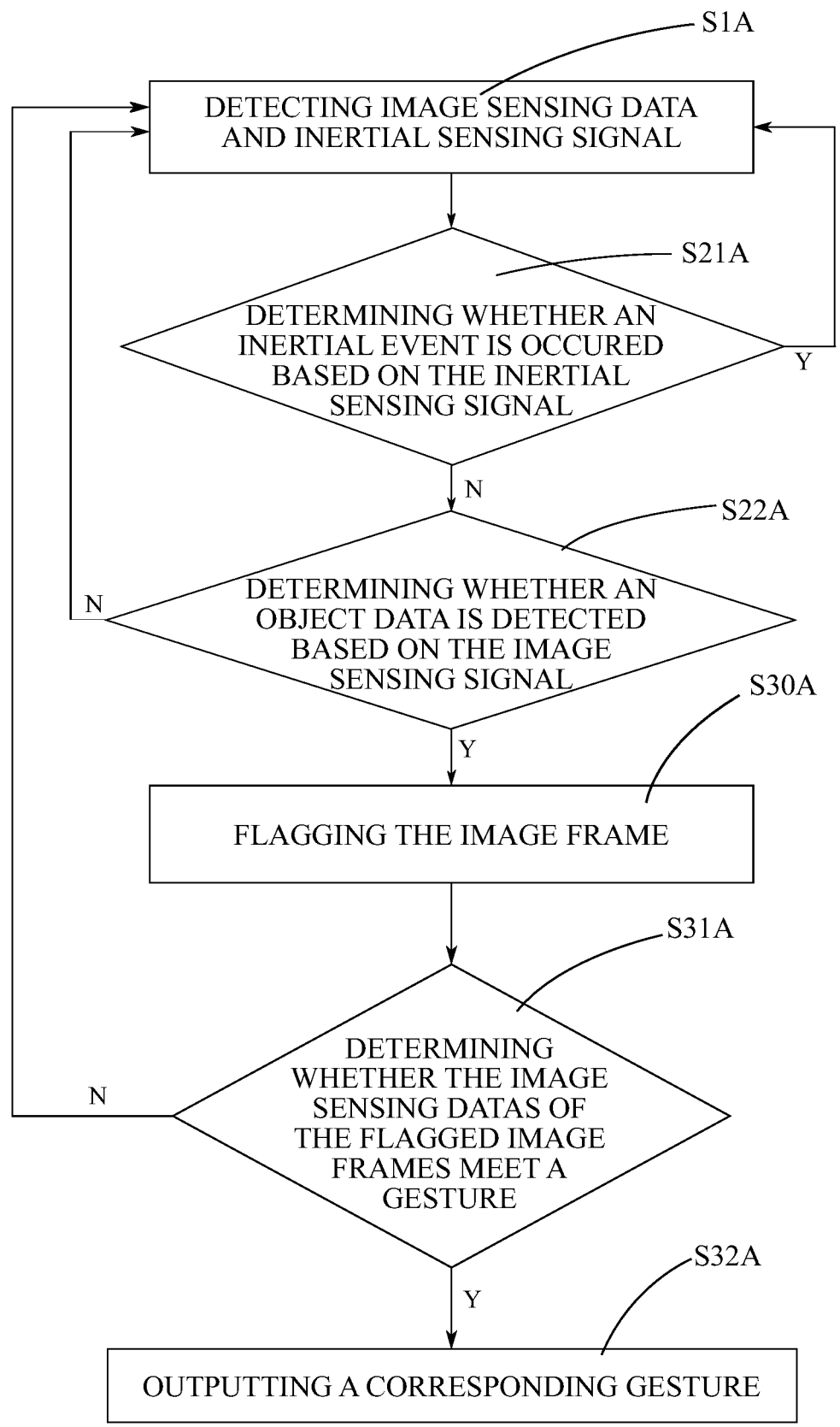
FIG. 4 is a flow chart of a second embodiment of a method for determining non-contact gesture in accordance with the present invention.

In one embodiment as shown in FIG. 4, the step S2 comprises steps S21A and S22A and the step S3 comprises steps S30A, S31A and S32A: The processor 10 determines whether an inertial event is occurred based on the inertial sensing signal $S_I$ (S21A). If yes, then the processor 10 goes back to execute the step S1A to keep detecting the image sensing data $S_G$ and the inertial sensing signal $S_I$. If no, the processor 10 executes the step S22A. The processor 10 determines whether an object data is detected based on the image sensing data $S_G$ (S22A). If no, the processor 10 goes back to execute the step S1A. If yes, the processor 10 executes the step S30A. The processor 10 flags the image frame that is determined as yes in step S22A in the storage unit 11, 40 (S30A). Then the processor 10 determines whether the image sensing data $S_G$ of the flagged image frames meet a gesture (S31A). If yes, then a corresponding gesture is output. If no, the processor 10 goes back to execute the step S1A.

Figure 5:
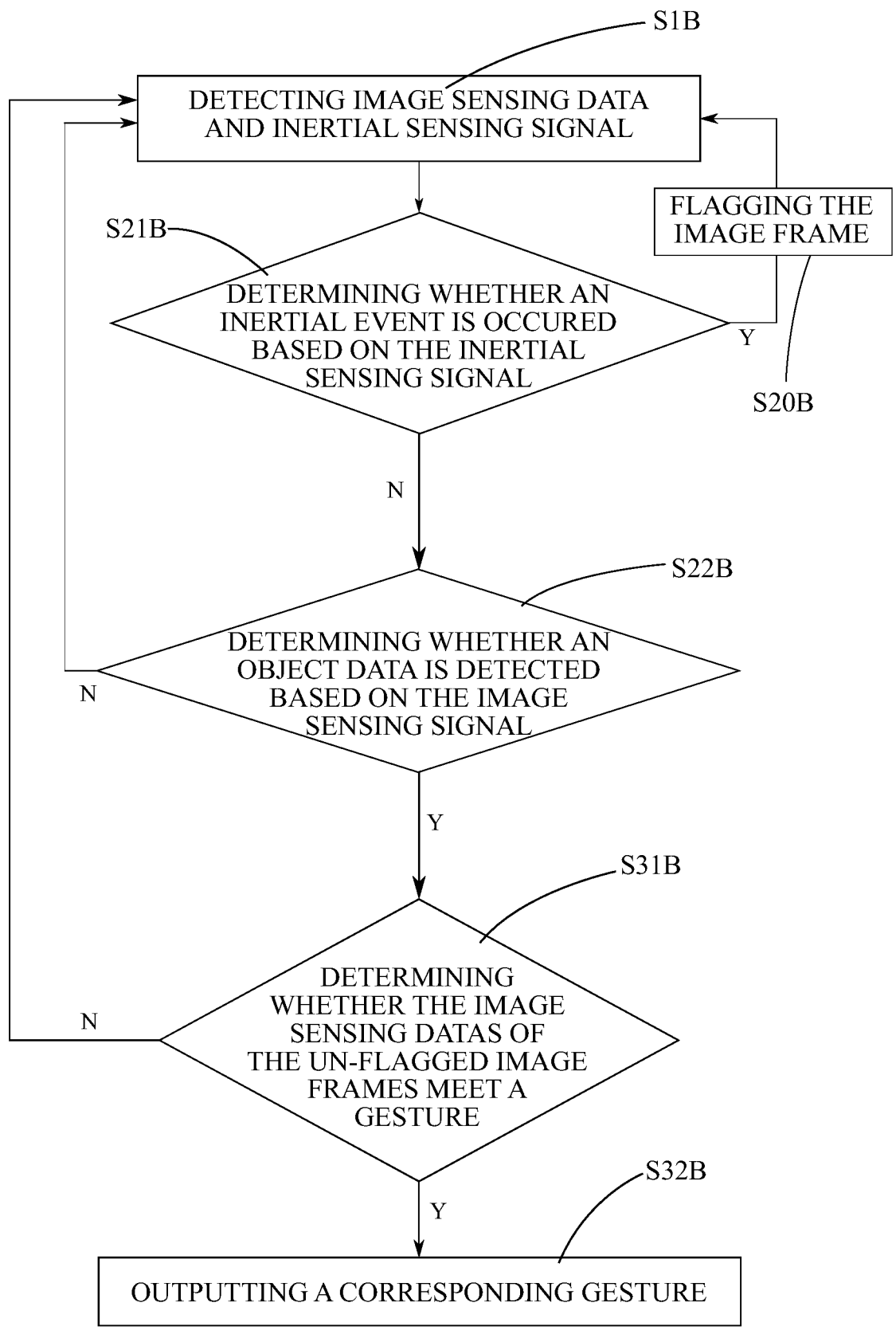
FIG. 5 is a flow chart of a third embodiment of a method for determining non-contact gesture in accordance with the present invention.

In one embodiment as shown in FIG. 5, the step S2 comprises steps S21B, S20B and S22B and the step S3 comprises steps S31B and S32B: The processor 10 determines whether an inertial event is occurred based on the inertial sensing signal $S_I$ (S21B). If yes, then the processor 10 flags the image frame that occurs the inertial event in the storage unit 11, 40 (S20B). Then the processor 10 goes back to execute the step S1B to keep detecting the image sensing data $S_G$ and the inertial sensing signal $S_I$. If no, the processor 10 executes the step S22B. The processor 10 determines whether an object data is detected based on the image sensing data $S_G$ (S22B). If no, the processor 10 goes back to execute the step S1B. If yes, the processor 10 executes the step S31B. The processor 10 determines whether the image sensing data $S_G$ of those un-flagged image frames meet a gesture (S31B). If yes, then a corresponding gesture is output. If no, the processor 10 goes back to execute the step S1B.

Figure 6:
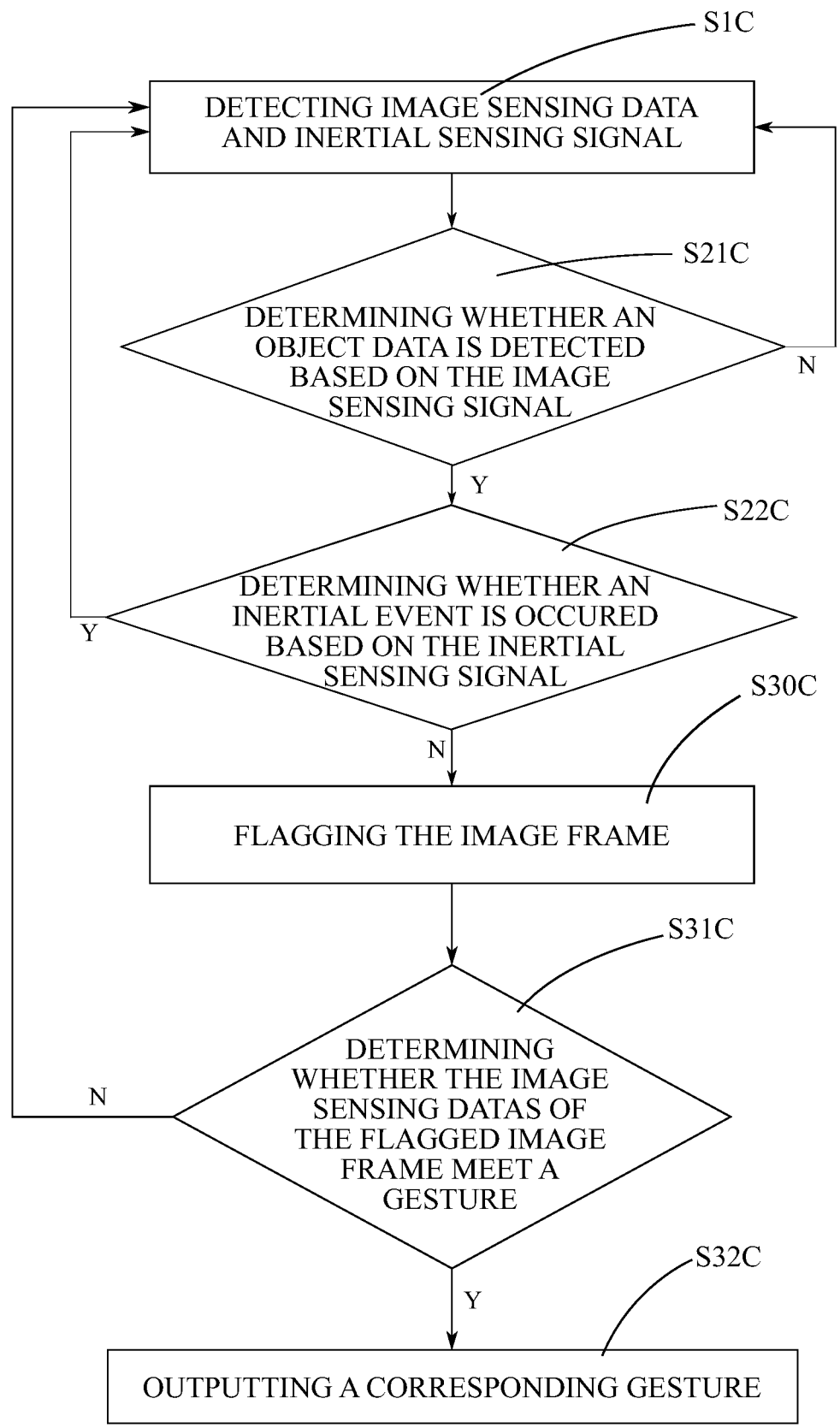
FIG. 6 is a flow chart of a fourth embodiment of a method for determining non-contact gesture in accordance with the present invention.

In one embodiment as shown in FIG. 6, the step S2 comprises steps S21C and S22C and the step S3 comprises steps S30C, S31C and S32C: The processor 10 determines whether an object data is detected based on the image sensing data $S_G$ (S21C). If no, then the processor 10 goes back to execute the step S1C to keep detecting the image sensing data $S_G$ and the inertial sensing signal $S_I$. If yes, the processor 10 executes the step S22C. The processor 10 determines whether an inertial event is occurred based on the inertial sensing signal $S_I$ (S22C). If yes, the processor 10 goes back to execute the step S1C. If no, the processor 10 executes the step S30C. The processor 10 flags the image frame that is determined as no in step S22C in the storage unit 11, 40 (S30C). Then the processor 10 determines whether the image sensing data $S_G$ of the flagged image frames meet a gesture (S31C). If yes, then a corresponding gesture is output. If no, the processor 10 goes back to execute the step S1C.

Figure 7:
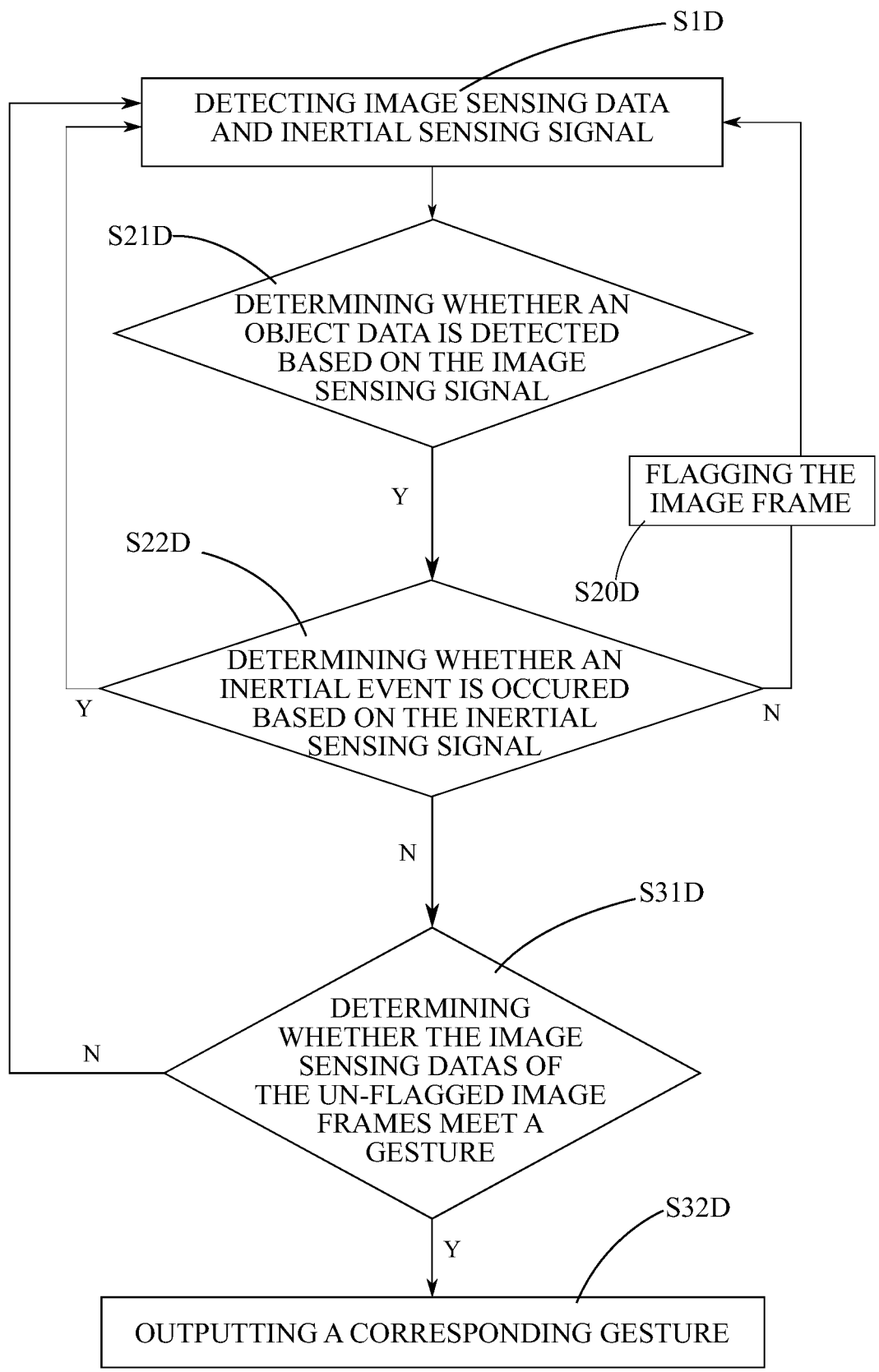
FIG. 7 is a flow chart of a fifth embodiment of a method for determining non-contact gesture in accordance with the present invention.

In one embodiment as shown in FIG. 7, the step S2 comprises steps S21D, S20D and S22D and the step S3 comprises steps S31D and S32D: The processor 10 determines whether an object data is detected based on the image sensing data $S_G$ (S21D). If no, the processor 10 goes back to execute the step S1D to keep detecting the image sensing data $S_G$ and the inertial sensing signal $S_I$. If yes, the processor 10 executes the step S22D. The processor 10 determines whether an inertial event is occurred based on the inertial sensing signal $S_I$ (S22D). If yes, the processor 10 flags the image frame that occurs the inertial event in the storage unit 11, 40 (S20D). Then the processor 10 goes back to execute the step S1D. If no, the processor 10 executes the step S31D. The processor 10 determines whether the image sensing data $S_G$ of those un-flagged image frames meet a gesture (S31D). If yes, then a corresponding gesture is output. If no, the processor 10 goes back to execute the step S1D.

In the embodiments as shown in FIGS. 4 and 5, the processor 10 determines whether an inertial event is occurred based on the inertial sensing signal $S_I$ in advance. If the inertial event is occurred, the image sensing data $S_G$ is influenced by the inertial event and does not actually respond the user's desired operations or gestures. Therefore, to determine whether an object data is occurred is no longer needed. In addition, in the embodiments as shown in FIGS. 6 and 7, the processor 10 determines whether an object data is detected based on the image sensing data $S_G$ in advance. If no object data is detected, to determine gesture is no longer needed so that to determine whether an inertial event is occurred is also no longer needed. Therefore, based on the aforementioned embodiments shown in FIGS. 4 to 7, the processor 10 may execute one of the determination in advance to determine whether execute the other determination or go back to the step S1 so that the loading of the processor 10 is reduced to decrease the energy consumption.

In the embodiments as shown in FIGS. 5 and 7, the image frames that have the inertial events occurred are flagged. To avoid that the inertial events influencing the accuracy for determining the gesture at the time before and after the inertial events occurred, the image sensing data of the image frames that are adjacent to the flagged image frames are also eliminated when the image sensing data of the un-flagged image frames are determined whether a gesture is met (S31B, S31D). Then the image sensing data of the rest image frames that are not influenced by the inertial events are determined whether a gesture is met. Therefore, the influence caused by the inertial events to the determination of the gesture is effectively eliminated to enhance the accuracy of the determination of the gesture.

Figure 8:
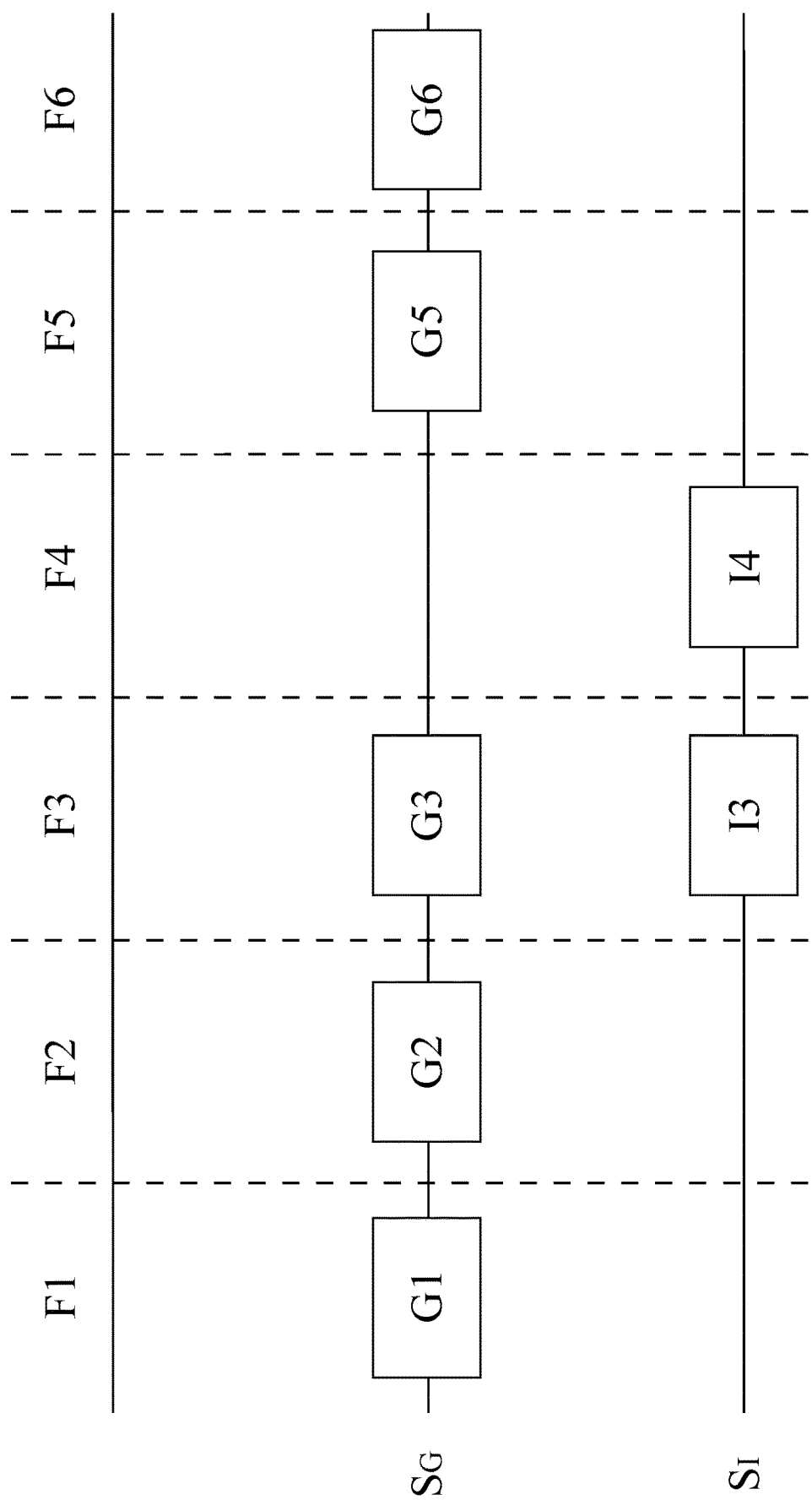
FIG. 8 is an operational time sequence diagram of the non-contact sensing device in accordance with the present invention.

A specific example is shown as following to illustrate the method as aforementioned method in accordance with the present invention:

With reference to FIGS. 4, 6 and 8, in a time period that multiple image frames F1 to F6 are occurred. In the image frame F1, the object data G1 is detected and no inertial event is occurred according the determinations in the steps S21A, S22A or in the steps S21C, S22C. Then the step S30A or the step S30C are executed to flag the image frame F1. Then the step S31A or the step S31C is executed to determine whether the image sensing data in the flagged image frame F1 meets a gesture. If the image sensing data does not meet a gesture, then the step S1A or the step S1C is executed to keep detecting. The image frame F2 has the same situation with the image frame F1. Only the object data G2 is detected and no inertial event is occurred. Thus, the image frame F2 is flagged according to the aforementioned step. When the step S31A or the step S31C is executed, the image sensing data of the flagged image frames F1, F2 are combined to determine whether a gesture is met. If a gesture is met, the step S32A or the step S32C is executed to output the corresponding gesture. If the image sensing data of the flagged image frames F1, F2 do not meet a gesture, then the step S1A or the step S1C is executed to keep detecting. At the image frame F3, an inertial event 13 is determined to be occurred based on the step S21A or the step S22C so that the step S1A or the step S1C is executed to keep detecting. At the image frame F4, an inertial event 14 is determined to be occurred based on the step S21A or the step S22C so that the step S1A or the step S1C is executed to keep detecting. The image frame F5 has the same situation with the image frame F1. Only the object data G5 is detected and no inertial event is occurred. Thus, the image frame F5 is flagged according to the aforementioned step. When the step S31A or the step S31C is executed, the image sensing data of the flagged image frames F1, F2, F5 are combined to determine whether a gesture is met. If a gesture is met, the step S32A or the step S32C is executed to output the corresponding gesture. If the image sensing data of the flagged image frames F1, F2, F5 do not meet a gesture, then the step S1A or the step S1C is executed to keep detecting. In one embodiment, when the step S31A or the step S31C is executed, the image sensing data of the image frames F2, F5 are also excluded because the image frames F2, F5 are adjacent to the un-flagged image frames F3, F4. Then only the image sensing data of the image frame F1 is used to determine whether a gesture is met.

Then, the image frame F6 has the same situation with the image frame F1. Only the object data G6 is detected and no inertial event is occurred. Thus, the image frame F6 is flagged according to the aforementioned step. When the step S31A or the step S31C is executed, the image sensing data of the flagged image frames F1, F2, F5, F6 are combined to determine whether a gesture is met. If a gesture is met, the step S32A or the step S32C is executed to output the corresponding gesture. If the image sensing data of the flagged image frames F1, F2, F5, F6 do not meet a gesture, then the step S1A or the step S1C is executed to keep detecting. In one embodiment, when the step S31A or the step S31C is executed, the image sensing data of the image frames F2, F5 are also excluded because the image frames F2, F5 are adjacent to the un-flagged image frames F3, F4. Then only the image sensing data of the image frames F1, F6 are used to determine whether a gesture is met.

With reference to FIGS. 5, 7 and 8, in a time period that multiple image frames F1 to F6 are occurred. In the image frame F1, the object data G1 is detected and no inertial event is occurred according the determinations in the steps S21B, S22B or in the steps S21D, S22D. Then the step S31B or the step S31D is executed to determine whether the image sensing data in the un-flagged image frame F1 meets a gesture. If the image sensing data of the un-flagged image frame F1 does not meet a gesture, then the step S1B or the step S1D is executed to keep detecting. The image frame F2 has the same situation with the image frame F1. Only the object data G2 is detected and no inertial event is occurred. Thus, the step S31B or the step S31D is executed according to the aforementioned step so that the image sensing data of the un-flagged image frames F1, F2 are combined to determine whether a gesture is met. If a gesture is met, the step S32B or the step S32D is executed to output the corresponding gesture. If the image sensing data of the un-flagged image frames F1, F2 do not meet a gesture, then the step S1B or the step S1D is executed to keep detecting. At the image frame F3, an inertial event 13 is determined to be occurred based on the step S21B or the step S22D so that the image frame F3 is flagged based on the step S20B or the step S20D. Then the step S1B or the step S1D is executed to keep detecting. At the image frame F4, an inertial event 14 is determined to be occurred based on the step S21B or the step S22D so that the image frame F4 is flagged based on the step S20B or the step S20D. Then the step S1B or the step S1D is executed to keep detecting. The image frame F5 has the same situation with the image frame F1. Only the object data G5 is detected and no inertial event is occurred. Thus, the step S31B or the step S31D is executed, the image sensing data of the un-flagged image frames F1, F2, F5 are combined to determine whether a gesture is met. If a gesture is met, the step S32B or the step S32D is executed to output the corresponding gesture. If the image sensing data the un-flagged image frames F1, F2, F5 do not meet a gesture, then the step S1B or the step S1D is executed to keep detecting. In one embodiment, when the step S31B or the step S31D is executed, the image sensing data of the image frames F2, F5 are also excluded because the image frames F2, F5 are adjacent to the flagged image frames F3, F4. Then only the image sensing data of the image frame F1 is used to determine whether a gesture is met.

Then, the image frame F6 has the same situation with the image frame F1. Only the object data G6 is detected and no inertial event is occurred. Thus the step S31B or the step S31D is executed, the image sensing data of the image frames F1, F2, F5, F6 are combined to determine whether a gesture is met. If a gesture is met, the step S32B or the step S32D is executed to output the corresponding gesture. If the image sensing data of the image frames F1, F2, F5, F6 do not meet a gesture, then the step S1B or the step S1D is executed to keep detecting. In one embodiment, when the step S31B or the step S31D is executed, the image sensing data of the image frames F2, F5 are also excluded because the image frames F2, F5 are adjacent to the flagged image frames F3, F4. Then only the image sensing data of the image frames F1, F6 are used to determine whether a gesture is met.

In conclusion, via the device and the method in accordance with the present invention, the influences of the inertial events caused by the accidentally vibration, movement, shaking and so on to determine the non-contact gesture are eliminated so that the image sensing data that is not influenced by the inertial events is used to determine the non-contact gesture. Therefore, the accuracy to determine the non-contact gesture is effectively enhanced.

Figure 9:
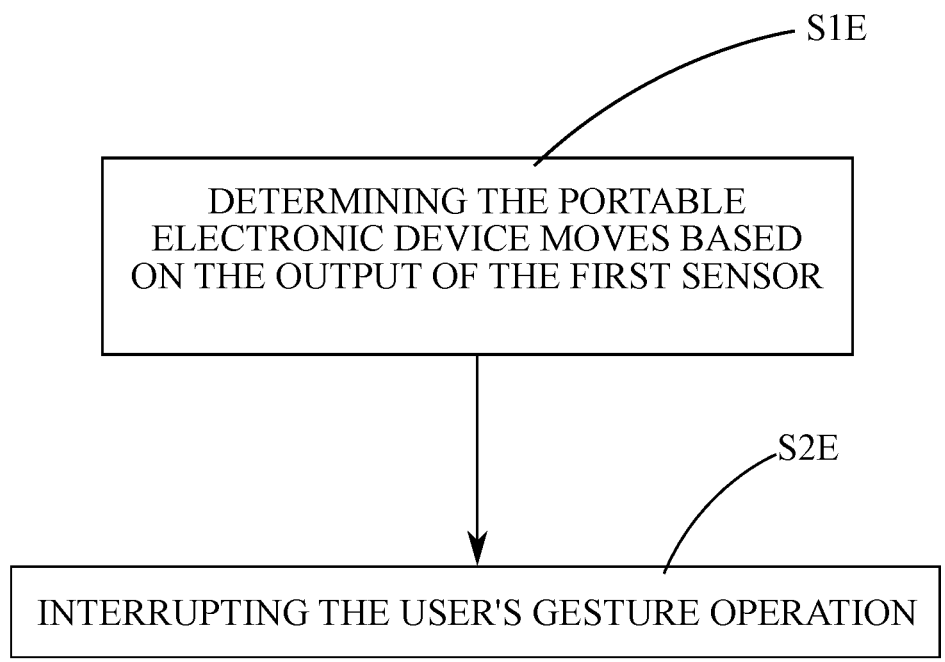
FIG. 9 is a flow chart of a sixth embodiment of a method for determining non-contact gesture in accordance with the present invention.

In another embodiment as shown in FIG. 9, a method in accordance with the present invention applies to a portable electronic device. The portable electronic device comprises a gesture detecting unit to detect a user's gesture operation and a first sensor to detect a movement of the portable electronic device its self. The method comprises steps of determining that the portable electronic moves based on the output of the first sensor (S1E) and interrupting the triggering caused by the user's gesture operation after the step S1E (S2E). The portable electronic device may be a non-contact sensing device. The gesture detecting unit may comprise one or more image sensor 30 as described. The first sensor may comprise one or more IMUs 20 as described. When the portable electronic device is determined as occurring movement, it may be mean that the sensing value of the sensing signal detected by the first sensor exceeds a predetermined threshold. When the triggering caused by the user's gesture operation is interrupted, it may be mean that the detected gesture operation is abandoned.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for determining a non-contact gesture comprising steps of:
   a. detecting an image sensing data in a detecting range of a non-contact sensing device, and detecting an inertial sensing signal of the non-contact sensing device itself;
   b. determining whether an inertial event is occurred based on the inertial sensing signal, determining whether an object data is detected based on the image sensing data;
   c1. when no inertial event is occurred and an object data is detected, flagging the image frame;
   c2. determining whether the image sensing data in the flagged image frames meet a gesture; if no, then back to the step a; if yes, then executing the step c3; and
   c3. outputting a corresponding gesture.

2. The method as claimed in claim 1, wherein in the step b, first determining whether an inertial event is occurred, and then further determining whether an object data is detected when no inertial event is occurred, and back to the step a when an inertial event is occurred.

3. The method as claimed in claim 2, wherein when no inertial event is occurred and further determining whether an object data is detected, back to the step a when no object data is detected.

4. The method as claimed in claim 1, wherein in the step b to determine whether an inertial event is occurred means that a sensing value of the inertial sensing signal is compared with a threshold, and an inertial event is occurred when the inertial sensing signal exceeds the threshold.

5. The method as claimed in claim 1, wherein in the step b to determine whether an object data is detected means to determine whether the image sensing signal meets features of one of predetermined objects.

6. A non-contact sensing device comprising:
   a processor;
   an inertial measurement sensor (IMU) electrically connected to the processor;
   at least one image sensor electrically connected to the processor;
   wherein the processor executes following steps:
   a. receiving an image sensing data detected by the at least one image sensor, and receiving an inertial sensing signal of the non-contact sensing device itself detected by the IMU;
   b. determining whether an inertial event is occurred based on the inertial sensing signal, determining whether an object data is detected based on the image sensing data; and
   c1. when no inertial event is occurred and an object data is detected, flagging the image frame;
   c2. determining whether the image sensing data in the flagged image frames meet a gesture; if no, then back to the step a; if yes, then executing the step c3; and
   c3. outputting a corresponding gesture.

7. The non-contact sensing device as claimed in claim 6, wherein the inertial sensor is selected from an accelerometer, a gyroscope and a magnetometer.

8. The non-contact sensing device as claimed in claim 6 further comprising a storage unit built in the processor or an external storage unit electrically connected to the processor.

9. The non-contact sensing device as claimed in claim 6, wherein in the step b executed by the processor, first determining whether an inertial event is occurred, and then further determining whether an object data is detected when no inertial event is occurred, and back to the step a when an inertial event is occurred.

10. The non-contact sensing device as claimed in claim 9, wherein in the step b executed by the processor, when no inertial event is occurred and further determining whether an object data is detected, back to the step a when no object data is detected.

11. The non-contact sensing device as claimed in claim 6, wherein in the step b executed by the processor to determine whether an inertial event is occurred means that a sensing value of the inertial sensing signal is compared with a threshold, and an inertial event is occurred when the inertial sensing signal exceeds the threshold.

12. The non-contact sensing device as claimed in claim 6, wherein in the step b executed by the processor to determine whether an object data is detected means to determine whether the image sensing signal meets features of one of predetermined objects.

\* \* \* \* \*